No. 856,743. PATENTED JUNE 11, 1907.
J. O. THOMSON.
PNEUMATIC TIRE.
APPLICATION FILED DEC. 4, 1906.

Attest
A. M. Kelly
A. Rettig

Inventor
Jesse O. Thomson,

UNITED STATES PATENT OFFICE.

JESSE ORR THOMSON, OF PHILADELPHIA, PENNSYLVANIA.

PNEUMATIC TIRE.

No. 856,743.　　　Specification of Letters Patent.　　　Patented June 11, 1907.

Application filed December 4, 1906. Serial No. 346,198.

*To all whom it may concern:*

Be it known that I, JESSE ORR THOMSON, of the city and county of Philadelphia, State of Pennsylvania, have invented an Improvement in Pneumatic Tires, of which the following is a specification.

My invention has reference to pneumatic tires and consists of certain improvements which are fully set forth in the following specification and shown in the accompanying drawings which form a part thereof:

The object of my invention is to so construct a pneumatic tire, suitable for automobiles, that it shall be substantially proof against punctures and have its wearing parts replaced when worn or injured, whereby its life and durability may be increased.

My invention consists of the usual inner or pneumatic tube combined with a shoe or outer covering having a series of circumferential rubber sections constituting the wearing parts of the shoe.

It further consists in making the said circumferential rubber sections removable and attachable with respect to the shoe by means of metallic fasteners.

My invention further consists of forming the circumferential sections of the shoe with lateral interlocking parts, whereby the sections engage each other in addition to being independently connected with the shoe proper.

Figure 1:
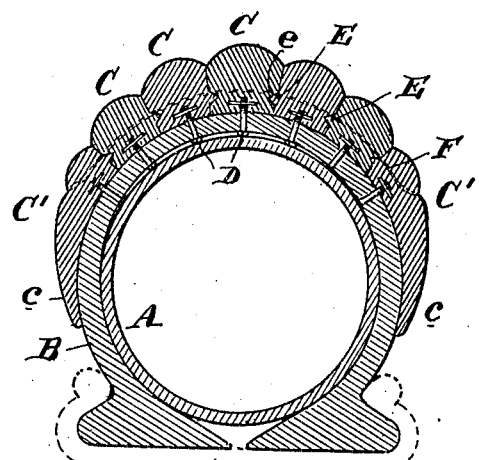
Figure 2:
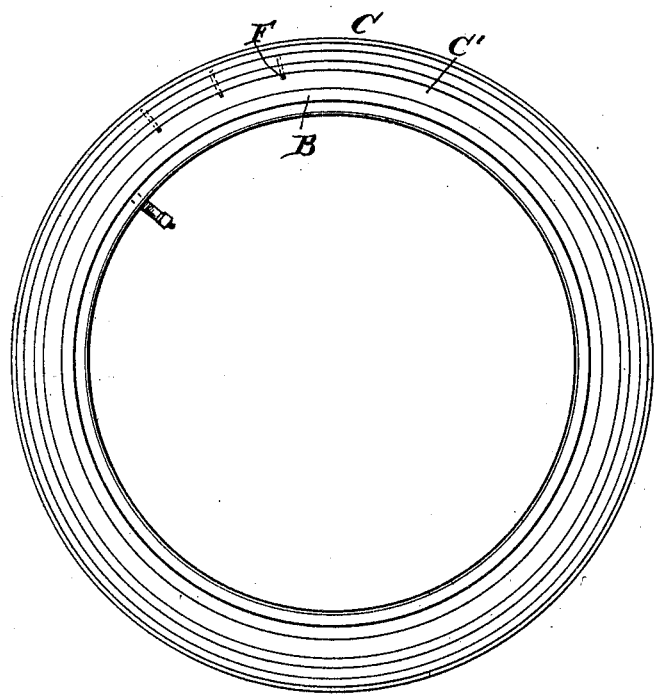
Figure 3:
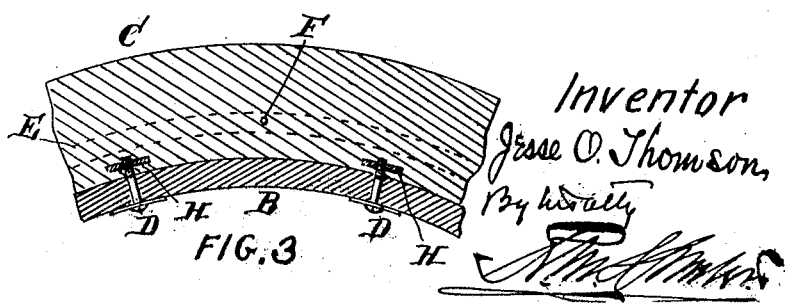

My invention also comprehends details of construction which, together with the features above specified, will be better understood by reference to the drawings, in which:

Figure 1 is a cross section through a portion of my improved pneumatic tire; Fig. 2 is a side elevation of my improved tire; and Fig. 3 is a circumferential section of a portion of the shoe.

A is the inner tube which is inflated with air to form a pneumatic tire. This inner pneumatic tube may be formed in any suitable manner such as is commonly employed in automobile tires.

B is the outer shoe and is usually made of rubber and fabric to give great strength, as is well known in the art. This shoe may inclose the pneumatic tube A in any suitable manner, the form shown being given as an example. The wearing portion of this shoe B is provided with a series of circumferential wearing parts C C' of which the parts C receive the greatest wear, and the parts C' the least wear. The parts C C' are preferably thickest at the extreme periphery of the tire, and decrease somewhat in thickness toward the parts C', being thinnest at the parts c which are slightly beyond the transverse diameter. These circumferential parts C C' are also preferably rounded in cross section at their outer surfaces so as to present a greater resistance to lateral slippage or skidding, but the shape of these outer surfaces may be modified to suit the wishes of the manufacturer. These circumferential parts C C' are attached to the shoe B in any suitable manner, but preferably by means of screws D extending through the shoe B and attached to plates H embedded in the rubber of the circumferential parts C C'. There may be any number of these fasteners arranged around the circumference of the shoe, two of such fasteners for one section C being shown for example in Fig. 3. Any other suitable metallic fastener may be employed in lieu of those shown if so desired.

I prefer to provide the adjacent parts C C' with interlocking parts E e, the parts E constituting circumferential ribs and the parts e constituting circumferential recesses into which the ribs fit, as clearly shown in Fig. 1. The interlocking of these parts C C' may be made in any suitable manner found desirable. If preferred this interlocking may be reinforced by transverse wires F which may pass transversely through the several sections C C' or any portion of them as desired, said wires being in the nature of binders threaded through them approximating to stitching. These wires are shown in dotted lines in Fig. 1, and are also indicated at three places in Fig. 2, but it is to be understood that these transverse wires are placed inward through the entire circumference of the wheel as desired, the three places indicated in Fig. 2 being merely an example.

In the matter of the sections C' of the shoe, they are made much wider than the sections C, but are thinner at c, and these parts C c are not required to be specially attached to the shoe because the shape of the section C' when the inner tube is inflated will cause said parts C to hug the shoe as indicated in Fig. 1. These circumferential sections C C' not only act as replaceable wearing parts which may be replaced when materially worn but also act as means to prevent the puncturing of the tires at all vulnerable points.

By my improvement, it is possible to readily repair a tire when considerably worn, and thereby greatly increase its life over that which is possible where the tire is formed with a shoe of one integral piece.

While I prefer the construction shown, the minor details may be modified without departing from the spirit of my invention.

Having now described my invention, what I claim as new and desire to secure by Letters Patent, is:

1. In a pneumatic tire, the combination of the inner pneumatic tube with a continuous shoe inclosing said tube, a series of continuous circumferential removable wearing sections inclosing the shoe and arranged side by side in abutting relation transversely considered, and separate means for detachably connecting each of said circumferential sections independently to the shoe.

2. In a pneumatic tire, the combination of the inner pneumatic tube with a shoe inclosing said tube, a series of circumferential removable wearing sections inclosing the shoe and arranged side by side in abutting relation transversely considered, and separate means for detachably connecting said circumferential sections to the shoe consisting of plates embedded in the circumferential sections and screws extending from the inner side of the shoe and connecting with the plates.

3. In a pneumatic tire, the combination of the inner pneumatic tube with a shoe inclosing said tube, a series of circumferential removable wearing sections inclosing the shoe and arranged side by side transversely considered and provided with interlocking circumferential parts, and separate means for detachably connecting each of said circumferential sections to the shoe.

4. In a pneumatic tire, the combination of the inner pneumatic tube with a shoe inclosing said tube, a series of circumferential removable wearing sections inclosing the shoe and arranged side by side in abutting relation transversely considered, separate means for detachably connecting each of said circumferential sections to the shoe, and transversely arranged binding wires threaded transversely through the series of circumferential wearing sections.

5. A shoe for a pneumatic tire consisting of a tubular portion having a series of continuous circumferential wearing sections C C' arranged about its outer circumference in abutting contact and in which the sections C' are provided with inwardly directed portions c, and independent metallic devices for detachably connecting each of the several sections C C' to the shoe, whereby they are held transversely and circumferentially in close transverse contact with each other and with the shoe.

6. A shoe for a pneumatic tire consisting of a tubular portion having a series of circumferential wearing sections C C' arranged about its outer circumference and in which the sections C' are provided with inwardly directed portions c, the outer circumferential surface of each of the sections C being exteriorly curved in cross section so as to form a series of parallel circumferential ribs on the outer portion of the tire, and metallic devices for independently detachably connecting the several sections C C' to the shoe, whereby they are held in close transverse contact with each other and with the shoe both transversely and circumferentially.

In testimony of which invention, I have hereunto set my hand.

JESSE ORR THOMSON.

Witnesses:
R. M. HUNTER,
R. M. KELLY.